United States Patent
O'Toole, Jr.

(10) Patent No.: US 7,461,262 B1
(45) Date of Patent: Dec. 2, 2008

(54) METHODS AND APPARATUS FOR PROVIDING SECURITY IN A CACHING DEVICE

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 960 days.

(21) Appl. No.: 10/100,810

(22) Filed: Mar. 19, 2002

(51) Int. Cl.
*H04L 9/00* (2006.01)
*G06F 7/04* (2006.01)
*G06F 17/00* (2006.01)
*G06F 15/16* (2006.01)
*H04K 1/00* (2006.01)

(52) U.S. Cl. .................. 713/182; 713/154; 713/165; 713/178; 726/4; 726/5; 726/14; 726/27; 709/202; 709/229; 380/255

(58) Field of Classification Search .............. 713/154, 713/165, 178, 182, 200, 201
See application file for complete search history.

(56) References Cited

U.S. PATENT DOCUMENTS

| | | | | |
|---|---|---|---|---|
| 5,235,642 | A * | 8/1993 | Wobber et al. | 713/156 |
| 5,611,049 | A * | 3/1997 | Pitts | 707/8 |
| 5,943,321 | A * | 8/1999 | St-Hilaire et al. | 370/259 |
| 5,991,810 | A * | 11/1999 | Shapiro et al. | 709/229 |
| 6,026,452 | A * | 2/2000 | Pitts | 710/56 |
| 6,189,046 | B1 * | 2/2001 | Moore et al. | 719/315 |
| 6,256,739 | B1 * | 7/2001 | Skopp et al. | 726/2 |
| 6,324,648 | B1 | 11/2001 | Grantges, Jr. | 713/201 |
| 6,344,794 | B1 * | 2/2002 | Ulrich et al. | 340/539.16 |
| 6,366,952 | B2 * | 4/2002 | Pitts | 709/217 |
| 6,389,460 | B1 * | 5/2002 | Stewart et al. | 709/217 |
| 6,389,541 | B1 | 5/2002 | Patterson | 713/201 |
| 6,397,246 | B1 | 5/2002 | Wolfe | 709/217 |
| 6,405,245 | B1 | 6/2002 | Burson et al. | 709/602 |
| 6,490,624 | B1 * | 12/2002 | Sampson et al. | 709/227 |
| 6,505,241 | B2 * | 1/2003 | Pitts | 709/218 |

(Continued)

FOREIGN PATENT DOCUMENTS

EP    1457892 A1 *  9/2004

(Continued)

OTHER PUBLICATIONS

Awad et al, Predicting WWW surfing using multiple evidence combination, 2008, ACM, pp. 401-417.*

(Continued)

*Primary Examiner*—Ayaz R Sheikh
*Assistant Examiner*—Aravind K Moorthy
(74) *Attorney, Agent, or Firm*—Bainwood Huang

(57) ABSTRACT

The invention is directed to techniques, in a caching device, for providing content, comprising the steps of obtaining content from an origin server, observing an access identifier provided by the origin server in response to a first content request, the access identifier providing an authentication indication for accessing the content obtained from the origin server, receiving a second content request, and one of (i) preventing the origin server from handling the second content request and providing the obtained content when the second content request includes the access identifier, and (ii) forwarding the second content request to the origin server for processing when the second content request does not include the access identifier.

23 Claims, 9 Drawing Sheets

U.S. PATENT DOCUMENTS

| | | | |
|---|---|---|---|
| 6,519,647 B1 * | 2/2003 | Howard et al. | 709/229 |
| 6,553,409 B1 * | 4/2003 | Zhang et al. | 709/213 |
| 6,662,230 B1 * | 12/2003 | Eichstaedt et al. | 709/229 |
| 6,715,082 B1 * | 3/2004 | Chang et al. | 713/201 |
| 6,789,170 B1 * | 9/2004 | Jacobs et al. | 711/133 |
| 6,950,936 B2 * | 9/2005 | Subramaniam et al. | 713/169 |
| 2002/0059181 A1 * | 5/2002 | Kohda et al. | 707/1 |
| 2006/0075230 A1 * | 4/2006 | Baird et al. | 713/168 |
| 2006/0230265 A1 * | 10/2006 | Krishna | 713/158 |
| 2007/0179985 A1 * | 8/2007 | Knowles et al. | 707/200 |
| 2007/0180125 A1 * | 8/2007 | Knowles et al. | 709/227 |
| 2007/0233957 A1 * | 10/2007 | Lev-Ran et al. | 711/118 |
| 2007/0245409 A1 * | 10/2007 | Harris et al. | 726/5 |
| 2007/0271375 A1 * | 11/2007 | Hwang | 709/224 |

FOREIGN PATENT DOCUMENTS

| | | |
|---|---|---|
| WO | WO 0154342 A1 * | 7/2001 |
| WO | WO 2005048526 A1 * | 5/2005 |

OTHER PUBLICATIONS

Yang et al, A DoS-limiting Network Architecture, 2005, ACM, pp. 241-252.*

Park et al, Secure Cookies on the Web, 2000, IEEE, pp. 36-44.*

Liu et al, A Secure Cookie Protocol, 2005, IEEE, pp. 333-338.*

* cited by examiner

600

| CLIENT ID | REQUEST LOCATION | HOSTNAME INFORMATION | DATA | ACCESS IDENTIFIER |
|---|---|---|---|---|
| 24.32.146.108 | WWW.HOME-PAGE.COM | 600, 25, 10 1, 000108 | HOMEPAGE FILES | USER1039560, 010626, 5980... |
| USER02488_11 | WWW.NEWS | 600, 12, 10 1, 990512 | NEWS PAGE FILES | USER1009846, 990112, 8950... |
| 104.42.36.121 | WWW.HOME-PAGE.COM | 600, 25, 10 1, 010919 | HOMEPAGE FILES | USER1142648, 990802, 1988... |
| USER049327 | WWW.FINANCE-PAGE.COM | 060, 100, 10 1, 010115 | FINANCIAL PG FILES | USER1184266, 001214, 9920... |
| 24.32.146.108 | WWW.HOME-PAGE.COM | 600, 25, 10 1, 010408 | | |

USER0000000, 010800, 1739

METHODS AND APPARATUS FOR PROVIDING SECURITY IN A CACHING DEVICE

BACKGROUND OF THE INVENTION

As the Internet grows in maturity as a medium for providing content to users, it has evolved to incorporate different methods and mechanisms that enhance the speed and efficiency of delivering user-requested content. In particular, methods and techniques exist by which servers are placed in locations that are convenient in terms of their geographic position, position in the network, or other factors related to the ease and speed of the server for delivering content to clients requesting it. In some cases content is duplicated on multiple servers located in such a fashion that each server is conveniently located for responding to requests that may be initiated from various different locations of the requesting clients. In other cases, special servers operate as so-called cache servers, that are able to store content, requested originally from another server and provide the same content in response to a later content request if the cache server is more conveniently located, and therefore able to provide the content more efficiently than the server that provided the content originally. In other situations such caching servers may be configured to store select content for which there may be a high volume of requests or for content which consumes large amounts of storage and/or transmission capacity, for example, which the cache server may be equipped to handle more effectively.

In some situations, content providers hire other companies that specialize in providing the server and/or network infrastructure needed to host the content of the content provider. In such an arrangement, the hosting companies and content providers enter into agreements in advance about the configuration and operating parameters under which the content that will be hosted by the hosting company will be served to the content-requesting public.

In order to control user access to content, it is common practice for clients to provide information along with content requests when sending requests to the servers. The servers use the information to identify users (i.e. the authentication process) and/or their right to access individual elements of requested content (i.e. the authorization process), and in turn, use the information as a basis for making decisions about whether a content request will be fulfilled or denied.

Content providers whose content will be accessed by client web browsers, use "cookies" which may contain the security and/or other information. The cookies are stored on client computers, in accordance with existing Internet protocols, as part of the process of providing requested content to the users. Servers can later read the cookies and use them for security and/or other provider-controlled decision making with respect to user content requests, etc.

SUMMARY OF THE INVENTION

Unfortunately there are shortcomings to the conventional techniques employed in cache servers for providing content in response to a user request. In particular, in order to provide security for the content served from cache storage, content provider and cache server operators (e.g. providing hosting services) must define and the cache servers must be configured according to side agreements independently of the step of storing cache content received from a content's source server(s). Accordingly, content providers usually identify, in advance, the format of cookies and the steps for validating individual cookies in order to provide the security. Unfortunately, doing so may also necessitate the communication of private or public key information, secret information, authentication keys, configuration information, etc. which the content provider would prefer to maintain solely within the content provider's own control.

Another shortcoming of conventional techniques for providing cache content is that cookie validation algorithms, used to provide security, are embedded in software code running on cache servers. Consequently it is sometimes necessary to change software on a cache server in order to use a different cookie format or validation algorithm. This circumstance is particularly problematic in the case of caches that must be shared by different content providers.

The embodiments of the invention are directed to security methods and mechanisms for providing content from a caching device (e.g. caching server). A caching device, so equipped, has the ability to provide security features for content that the caching device serves without the requirement of independent set-up and configuration of security parameters. This simplifies the provision of security features for cached content. It also simplifies the process of adding new content to be served by a caching device to the content already provided in that manner.

Accordingly, a caching device may be configured to intercept the first content request from a client computer system. If the caching device has not received a prior request (e.g. first or second content request) for the same content, the caching device forwards the first content request to an origin server that contains the requested content. In turn, upon receipt of the content transmitted by the origin server in response to the forwarded first content request, the caching device stores the content received from the origin server so that the caching device can, itself, fulfill a second content request (e.g. an additional content request or a future request) for the same content at a later time. Besides caching the content (e.g. received from the origin server), the caching device also performs the task of forwarding the requested content to the client computer system that initiated the first content request.

In addition to caching and forwarding the content, the caching device may also observe (e.g. read), cache and forward (e.g. to the client computer system) an access identifier (e.g. the access identifier or cookie transmitted from the origin server, that provides the caching device with data that the origin server might otherwise have been sending to the client computer system as data to be used for security, authentication, etc. services) if an access identifier is provided by the origin server. Accordingly, in conjunction with a second content request received by a server (e.g. either an origin server or caching device) such a server may read the data located in the access identifier stored on a client computer system after the first content request for a variety of informational purposes. Such purposes may include, for example, identifying the existence and timing of a prior communication between the server and client, client identification information, authentication, other security functions, etc.

Upon later receipt of a second content request for the same content as the content cached on the caching device as a result of the first content request, the caching device is in a position to provide the content to a client computer in response to the second content request. The second request for content could either have been generated from the same computer system that generated the first content request or a different computer system.

Upon receipt of the second content request, the caching device also evaluates whether the access identifier transmitted by the client computer system to the caching device along with the second content request is the same as the access identifier transmitted by the origin server via the caching device to the client computer system (e.g. and which was saved on the client computer system for later retrieval) in response to the client computer system's first content request. If the access identifier is not the same as the earlier access identifier, the caching device will forward the second content request from the client computer system to the origin server to be processed. At that point, the origin server can conduct whatever authorization procedures that the origin server would have conducted if the origin server had received the second content request itself directly from the client computer system. In addition, the origin server may provide content, reject the request for content, or take any of a variety of other actions, etc. as typically performed in response to a request for content.

The caching device may also be configured to maintain a timeout clock which the caching device uses to determine if a predetermined amount of time has transpired since the caching device received a prior second content request (e.g. there may be repeat second content requests) from the client computer system. If the predetermined amount of time has transpired, the caching device will forward the second content request to the origin server even if the caching device has the content (e.g. received and cached in connection with an earlier content request) to fulfil the client request.

The caching device may also be configured, based on a user-selected option, to forward a second content request from the client computer system to the origin server for processing if the user initiating the second content request has changed since an earlier first or second content request. In that case, the origin server will provide the requested content along with an access identifier, if appropriate, as well as conduct any other processing appropriate for a second content request generated by a new user. For example, if user A initiates a second content request for content which the caching device caches and forwards to the user computer system when the caching device receives the obtained content from the origin server, then if user B later requests the same content, rather than provide the that content to the client computer system from cache, the caching device will forward the later second content request to the origin server for processing. This procedure enables the origin server, to re-evaluate the authorization of the caching device to provide the requested content to a new user requesting the content. Under this procedure, second content requests for the same user that are able to be served out of cache storage are thus served from cache storage. However, any second content requests for new users that should be subjected to authorization or other security evaluations that can only be provided by the origin server, will thus be appropriately processed by the origin server.

In a similar manner to comparing prior and current users of a second content request, the caching device may also be configured to provide content from within its cache as long as the resource locator (e.g. uniform resource locator) of the second content request matches a predetermined amount (e.g. number of characters) of the resource locator of either a prior first or second content request or a predetermined amount of a predetermined resource locator. For example, the caching device may be configured to provide content in response to a client request for any page matching the first 22 characters starting with "www.homepage.com/sales" in the URL, including such pages as www.homepage.com/sales/promotion, www.homepage.com/sales/prices, www.homepage.com/sales/items, etc., even though there is not an exact match of the full resource locator (e.g. the URL). As before, second content requests not meeting such criteria would be forwarded to the origin server for appropriate processing (e.g. in some cases, such as in the case of looking up information from a data base, it may appropriate for only the origin server to do such processing, that is, for example, such as when a needed data base is only accessible by the origin server).

The capabilities of the embodiments of the invention, as thus described, provide an effective way to implement a set of security control options for content served on a cached basis that would otherwise have to be served either without such security features or not served on a cached basis at all and provides a convenient mechanism for forwarding any content request requiring security features not otherwise available on the caching device to the origin server for appropriate handling.

In one embodiment, the caching device obtains content from an origin server. The caching device observes an access identifier provided by the origin server in response to a first content request, the access identifier providing an authentication indication for accessing the content obtained from the origin server. The caching device also receives a second content request, and either one of (i) prevents the origin server from handling the second content request and providing the obtained content when the second content request includes the access identifier, and (ii) forwards the second content request to the origin server for processing when the second content request does not include the access identifier.

The embodiments of the invention use the access identifier to determine if content should be provided in response to a client request. In order to do so, the caching device observes the access identifier returned by the origin server in response to the first content request from the client computer system. Accordingly, after the first content request, the caching device stores both the content and the access identifier provided by the origin server. The caching device, in response to a second content request can compare the access identifier that the requesting client computer system provides to the caching device which the client computer system received earlier from the origin server as a result of the first content requested. If the access identifier provided with the second content request is the same access identifier provided by the origin server in response to the first content request the caching device will return requested content to the client.

In another embodiment, the caching device modifies a table such that the table includes an entry authorizing the caching device to provide the obtained content in response to content requests which include the access identifier. The caching device can use such a table to determine if a client is authorized to receive content that the client has requested.

In another embodiment, the caching device starts a timeout clock in response to observing the access identifier provided by the origin server in response to a first content request and adjusts the table such that the caching device is no longer authorized to provide the obtained content in response to content requests which include the access identifier if the timeout clock exceeds a predetermined threshold.

Accordingly, client computer system content requests (e.g. first, second, or additional content requests) will be based on the access identifier delivered with the request within an established time limit matching an earlier access identifier provided by the origin server. If the caching device receives a second content request after the time limit, even though the second content request has the same access identifier transmitted with it, the caching device cannot fulfill the second content request from its cache. Instead, the caching device will forward such a second content request to the origin server for processing.

In another embodiment, the caching device changes the predetermined threshold to another threshold based on a command within the access identifier.

In one example the access identifier command may be an expiration time or date. Once the expiration time or date has been exceeded the caching device recognizes that the predetermined threshold will have to be reset and the caching device will forward such a second content request to the origin server. The caching device may also change the predetermined threshold to another threshold based on other types of commands within the access identifier as well.

In still another embodiment the caching device starts a timeout clock in response to observing the access identifier provided by the origin server in response to the first content request. Later the caching device may restart the timeout clock in response to observing another access identifier provided by the origin server in response to another content request.

If the caching device forwards a second content request to the origin server due to the expiration of the timeout clock, the origin server returns an access identifier which the caching device uses for future authorizations. The caching device resets the timeout clock in order to establish the time limit mechanism for future authorizations.

In another embodiment, the caching device prevents the origin server from handling an additional content request and provides the obtained content when a predetermined amount of the additional resource locator matches a predetermined amount of the first resource locator. The caching device forwards the additional content request to the origin server for processing when the predetermined amount of the additional resource locator does not match the predetermined amount of the first resource locator.

In this way the caching device is able to identify additional content requests that may be served from the cache of the caching device when a sufficient amount of the first and additional resource locators match, without the need to forward such additional content requests to the origin server.

In another embodiment, the caching device prevents the origin server from handling the additional content request and provides the obtained content when a predetermined amount of the additional client identifier matches a predetermined amount of the first client identifier. The caching device forwards the additional content request to the origin server for processing when the predetermined amount of the additional client identifier does not match the predetermined amount of the first client identifier.

In this way the caching device limits content that it will provide in response to a additional content request from a client computer system from client computer systems having the same client identifier.

In yet another embodiment, the caching device prevents the origin server from handling the additional content request and providing the obtained content when a predetermined amount of the additional resource locator matches a predetermined amount of the first resource locator and a predetermined amount of the additional client identifier matches a predetermined amount of the first client identifier. The caching device forwards the additional content request to the origin server for processing when the predetermined amount of the additional resource locator does not match the predetermined amount of the first resource locator. The caching device forwards the additional content request to the origin server for processing when the predetermined amount of the additional client identifier does not match the predetermined amount of the first client identifier.

In this way the caching device can provide content based upon matching both predetermined amounts of the resource locators and client identifiers.

The system, as will be described in more detail later, provides methods and mechanisms for caching selected content. The caching device intercepts both first content requests and second content requests sent by a client computer system. The caching device determines if it has the requested content in its cache as a result of fulfilling an earlier content request (e.g. first or second content request) for the same content. After receiving the requested content along with an access identifier, the caching device is in a position to serve such a future second content request from its own cache and provide the security afforded by the access identifier received from the origin server.

In another embodiment, the caching device read the timestamp in the access identifier and compares the timestamp to an expiration indicator. The caching device prevents the origin server from handling an additional content request and providing additional content when the timestamp does not exceed the expiration indicator. The caching device forwards the additional content request to the origin server for processing when the timestamp exceeds the expiration indicator.

The method enables the client computer to maintain the information needed (e.g. the timestamp stored in the access identifier) to determine when an access identifier should expire, thereby saving storage capacity that would otherwise be consumed on the caching device and/or origin server. Once the access identifier expires, the caching device is no longer authorized to provide the related content until re-authorized by the origin server.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 depicts a table that stores data used by the caching device to process requests for content according to one embodiment of the invention.

FIG. 8 shows data stored within an access identifier according to one embodiment of the invention.

DETAILED DESCRIPTION

Figure 1:
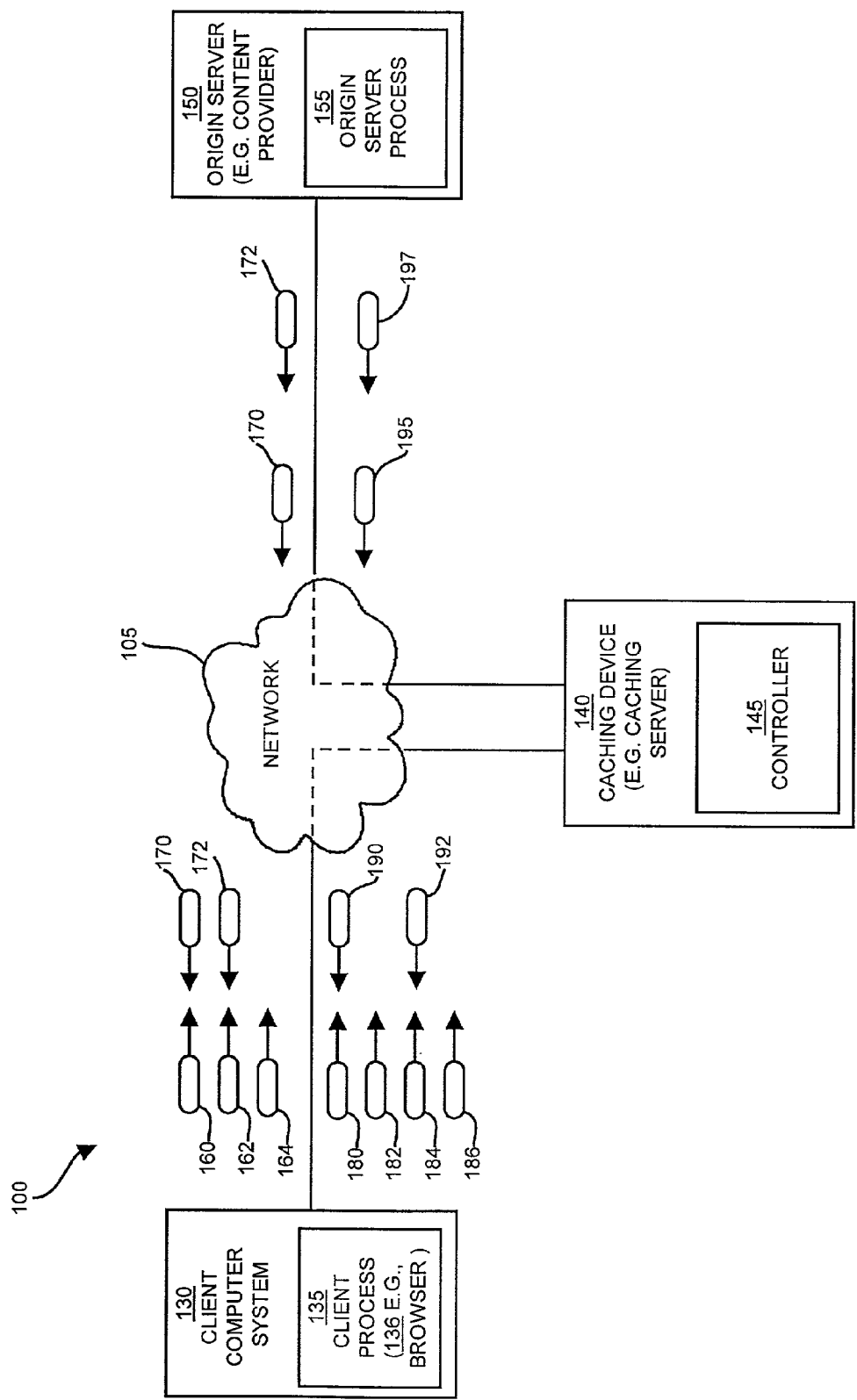
FIG. 1 is shows a system which is suitable for use by various embodiments of the invention.

The embodiments of the invention are directed to security methods and mechanisms for providing content from a caching device 140 (e.g. caching server). A caching device 140, so equipped, has the ability to provide security features for content that the caching device serves without the requirement of independent set-up and configuration of security parameters. The caching device 140 may be configured to intercept the first content request 160 from a client computer system 130. If the caching device 140 has not received a prior request (e.g. first or second content request 160, 180) for the same content, the caching device 140 forwards the first content request 160 to an origin server 150 that contains the requested content.

In turn, upon receipt of the obtained content 170 transmitted by the origin server 150 in response to the forwarded first content request 160, the caching device 140 stores the obtained content 170 received from the origin server 150 so that the caching device 140 can, itself, fulfill a second content request 180 for the same content at a later time. Besides caching the obtained content 170, the caching device 140 also performs the task of forwarding the obtained content 170 to the client computer system 130 that initiated the first content request 160.

In addition to caching and forwarding the obtained content 160, the caching device 140 also observes, caches and forwards an access identifier 172 also transmitted from the origin server 150. Later, in conjunction with a second content 180 request received by a server (e.g. either an origin server 150 or caching device 140) such a server may read the data located in the access identifier 182 stored on a client computer system 130 as a result of the first content request 160 for a variety of informational purposes. Such purposes may include, for example, identifying the existence and timing of a prior communication between the server and client, client identification information, authentication, other security functions, etc.

Upon a later receipt of a second content request 180 for the same content as the obtained content 170 cached on the caching device 140 as a result of the first content request 160, the caching device 140 will be in a position to provide the obtained content 170 to a client computer system 130 in response to the second content request 180. The second content request 180 could either have been generated from the same client computer system 130 that generated the first content request 160 or a different client computer system 130. FIG. 1 shows only client computer system 130, caching device 140 and origin server 150 for ease of description. In other arrangements, the system 100 may include multiple client computer systems 130, caching devices 140 and/or origin servers 150.

Upon receipt of the second content request 180, the caching device 140 also evaluates whether the access identifier 182 transmitted by the client computer system 130 to the caching device 140 along with the second content request 180 is the same as the access identifier 172 transmitted by the origin server 150 via the caching device 140 to the client computer system 130 (e.g. and which was saved on the client computer system 130 for later retrieval) in response to the client computer system's 130 first content request 160. If the access identifier 182 is not the same as the earlier access identifier 172, the caching device 140 will forward the second content request 180 from the client computer system 130 to the origin server 150 to be processed. At that point, the origin server 150 can conduct whatever authorization procedures that the origin server 150 would have conducted if the origin server 150 had received the second content request 180 itself directly from the client computer system 130. The origin server 150 may, at that point, provide content, reject the request for content, or take any of a variety of other actions, etc. as the origin server 150 is configured to perform.

The caching device 140 may also be configured to maintain a timeout clock 212 which the caching device 140 uses to determine if a predetermined threshold 208 of time has transpired since the caching device 140 received a prior second content request 180 (e.g. there may be repeat second content requests) from the client computer system 140. If the predetermined threshold 208 of time has transpired, the caching device 140 will forward the second content request 180 to the origin server 150 even if the caching device 140 has the obtained content 170 (e.g. received and cached in connection with an earlier first or second content request 160, 180).

In a similar manner, caching device 140 may be configured to forward a second content request 180 from the client computer system 130 to the origin server 150 for processing if the user initiating the second content request 180 has changed since an earlier first or second content request 160, 180.

Also, the caching device may be configured to provide content from within its cache (e.g. in a table 207) as long as the resource locator (e.g. such as a uniform resource locator; See FIG. 9, 660) of the second content request 180 matches a predetermined amount 152 (e.g. number of characters) of the resource locator of either a prior first or second content request 160, 180 or a predetermined amount 162 of a predetermined resource locator. As before, second content requests 180 not meeting such criteria would be forwarded to the origin server 150 for appropriate processing.

FIG. 1 shows a system 100 which is suitable for use according to one embodiment of the invention. The caching device 100 includes a network 105, a client computer system 130 having a client process 135 (e.g. such as an Internet browser 136), a caching device 140 (e.g. such as a caching server) having a controller 145, and an origin server 150 (e.g. such as a content provider) having an origin server process 155. In addition, the embodiments of the invention also have messages, communicated between the client computer system 130, caching device 140 and origin server 150 including a first content request 160, a first client identifier 162, a first resource locator 164, obtained content 170 (e.g. provided in response to the first content request 160), an access identifier 172 (e.g. provided in response to a first content request 160), a second content request 180, an access identifier 182 (e.g. transmitted along with the second content request 180), a second resource locator 184 (e.g. transmitted along with the second content request 180), a second client identifier 186, obtained content 190 (e.g. transmitted by the caching device 140 in response to a second content request 180), and an access identifier 192 (e.g. transmitted by the caching device in response to a second content request 180).

The caching device 140 (e.g. such as caching server which may operate as part of a network 105 of content delivery servers) has the ability to respond to a client computer system 130 (e.g. of which there may be multiple client computer systems 130 that initiate first and/or second content requests 160, 180) first and/or second content request(s) 160, 180 for content either by transmitting the content requested (e.g. obtained content 170, 190) from the caching device's 140 own cached memory (e.g. See FIG. 7, 600) or, under appropriate circumstances, the first and/or second content request(s) 160, 180 is (are) forwarded to the origin server 150 for further processing. In particular, the caching device 140 provides a convenient way to ensure proper authorization for the content requested on a cached basis without the necessity of prior agreements between operators of the origin server 150 and operators of the caching device 140 or communication of control parameters between the two devices.

The caching device 140 forwards first content request 160 (e.g. for content requested from the origin server 150 via the caching device 140 for the first time) to the origin server 150. The origin server 150, in turn, transmits obtained content 170 and an access identifier 172 to the client computer system 130 via the caching device 140 (e.g. the obtained content 170 and access identifier 172 are also stored in cache storage (e.g. See Table FIG. 7, 600) of the caching device 140) that are also ultimately destined to be stored on the client computer system 130. In response to a second content request 180 for the same content (e.g. obtained content 170, which was cached in response to the first content request 180), the caching device 140 can be in a position to provide the obtained content 190 requested by the client computer system 130 from the caching device's 140 cache storage (See FIG. 2, 207). The caching device 140, therefore, can provide the obtained content 190 to the client computer system 130 in response to the client computer system's 130 second content request 180, if the access identifier 182 also provided by the client computer system 130 to the caching device 140 satisfies the authorization requirements for the client computer system 130 (i.e. is the same as the access identifier 172 that the caching device 140 has saved in a table 207 which was provided by the origin server 150 to the client computer system 130 via the caching device 140 as a result of the first content request 160 for the same content). Otherwise, however, the caching device 140 will forward the second content request 180 to the origin server 150 so that the origin server 150 can administer whatever authorization restrictions or other security measures, etc. that the origin server 150 would administer if the origin server 140 had received the second content request 180, itself, from the client computer system 130.

Figure 2:
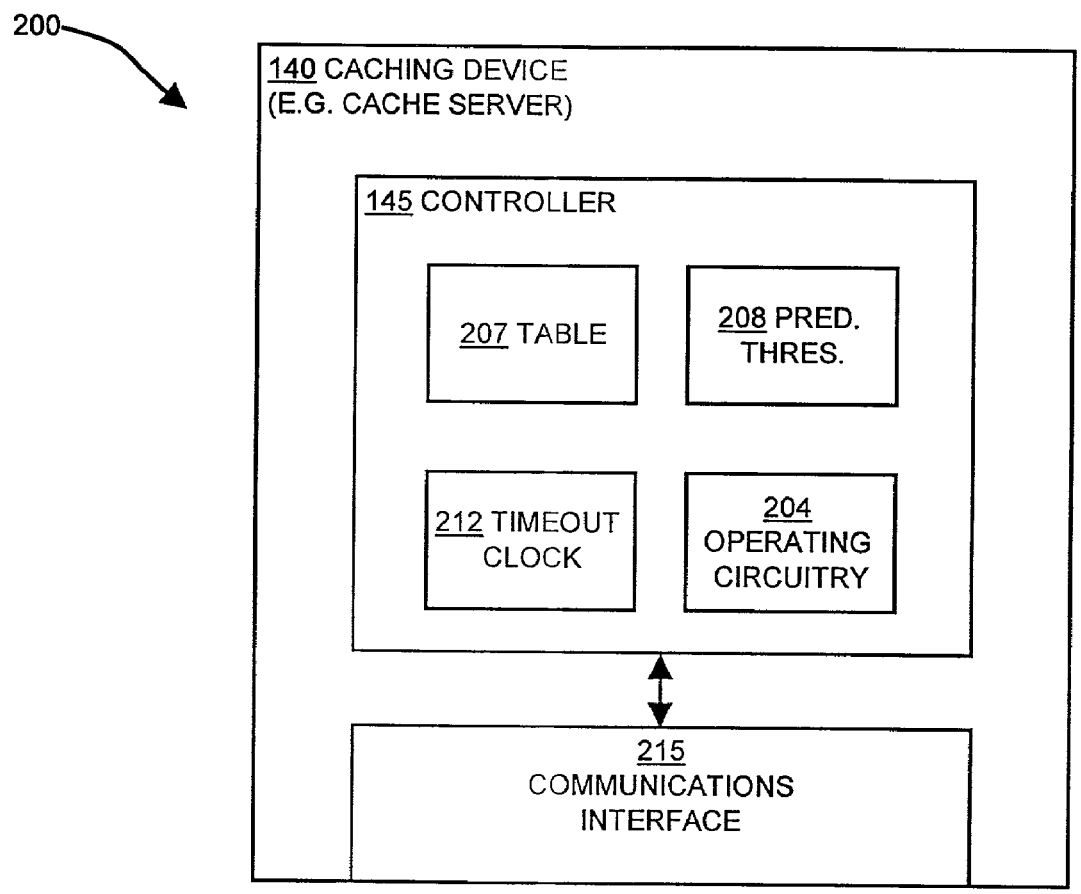
FIG. 2 depicts the components of the caching device according to one embodiment of the invention.

Further details of the embodiments of the invention will now be provided with reference to FIG. 2.

FIG. 2 depicts the components of the caching device 200 according to one embodiment of the invention.

The caching device 140 includes a communications interface 215, and a controller 145 having a table 207, a predetermined threshold 208, a timeout clock 212 and operating circuitry 204.

The communications interface 215 exchanges communications over a network 105 with devices, including, among others, client computer systems 130 and origin servers 150. Within the caching device 140, the communications interface 215 interfaces to and communicates with the controller 145. The operating circuitry 204, within the controller 145 performs a variety of processes including some related to the table 207, predetermined threshold 208, and 212 timeout clock components also found in the controller 145. For example, the operating circuitry 204 stores, reads and processes a variety of data in the table 207 such as client identifiers (See FIG. 7, 610), request location IP addresses or URL's (See FIG. 8, 612), hostname information (See FIG. 8, 614) such as a predetermined threshold (See FIG. 8, 630), a number of resource locator address characters (See FIG. 8, 638), a number of client identifier characters (See FIG. 8, 636) etc. Also stored within the table 207 are the data which make up the obtained content 170 (e.g. obtained content 170 cached within the caching device 140) such as web pages, etc., for example, and access identifiers 172 (e.g. access identifiers 172 that have been received from the origin server 150).

Also, the operating circuitry 204 performs a comparison of the elapsed time provided by the timeout clock 212 to a period of time defined by the predetermined threshold 208 in order to determine whether the caching device 140 remains authorized to provide content to the client computer system 130.

A more detailed description of the components of the catching device 140 will be provided later in conjunction with the caching device 140 procedures.

Figure 3:
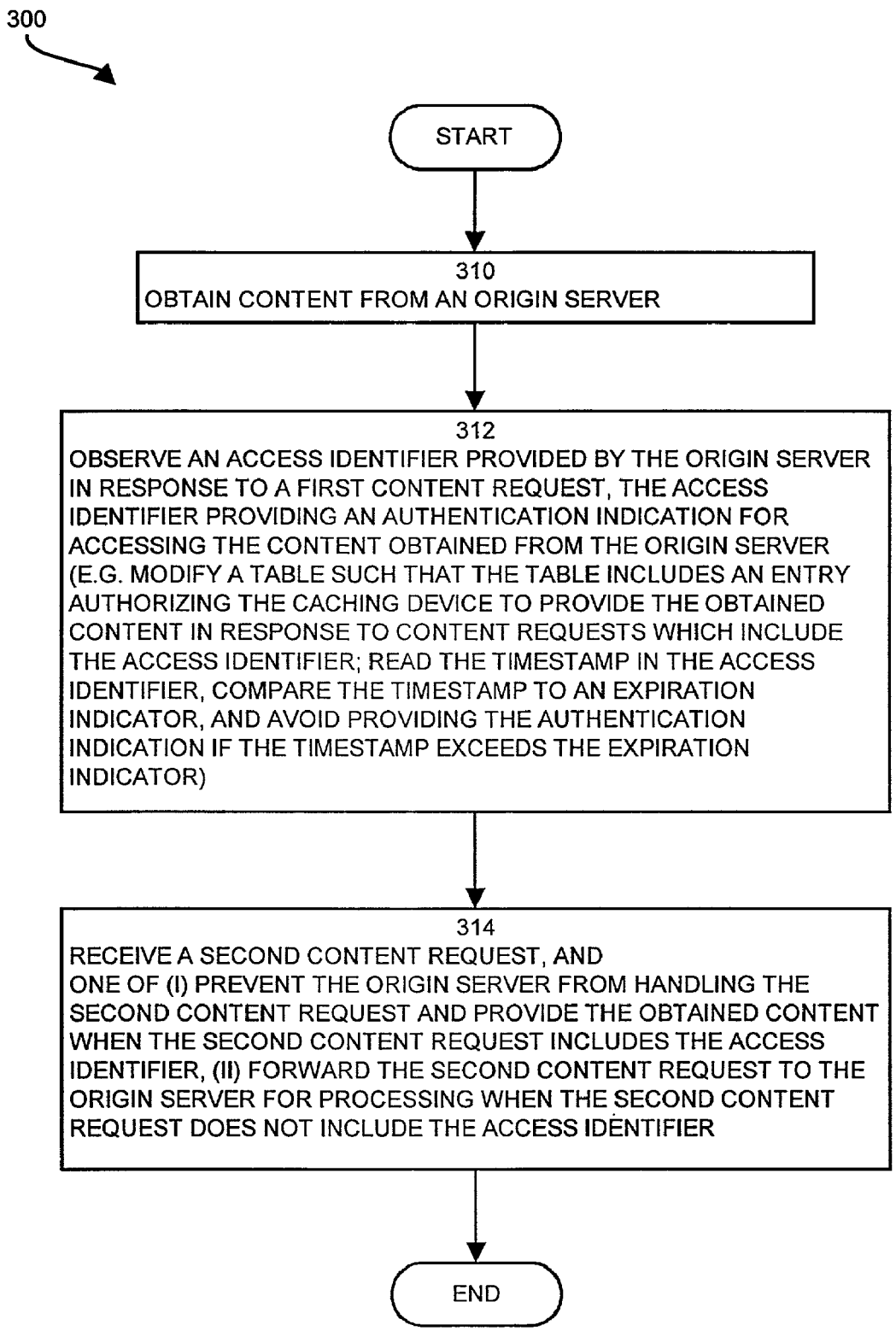
FIG. 3 is a flow chart of a procedure for obtaining content in response to first and second content requests.

Further details of the embodiments of the invention will now be provided with reference to FIG. 3.

FIG. 3 is a flow chart of a procedure 300 for obtaining content in response to a first and second content request 160, 180 performed by the caching device 140 according to one embodiment of the invention.

When the caching device 140 receives a content request, the content request 140 may either be a first content request 160 or second content request 180. If the content requested does not exist in the cache storage (See FIG. 2, 207 Table) of the caching device 140 the content request is treated as a first content request 160. On the other hand, if the content requested exists in cache storage (See FIG. 2, 207 Table) of the caching device 140, the content request will be treated as a second content 180. A caching device 140 may also receive a client identifier 164, 184 and resource locator 162, 182 as will be described in more detail later.

In step 310, the caching device 140 obtains content 170 from an origin server 150.

In the case of a first content request 160, the caching device 140 will obtain the requested content 170 from the origin server 150, as described earlier. If the content requested by the client computer system 130, does not exist in the caching device's 140 cache storage (See FIG. 2, 207 Table), the caching device 140 will forward the content request as a first content request 160 to the origin server 150. In turn, the caching device 140 obtains the content (e.g. obtained content 170) from the origin server 150. The caching device 140 also receives an access identifier 172 from the origin server 150. Upon receipt of the obtained content 170, the caching device 140 will store the obtained content 170 in cache storage (See FIG. 2, 207 Table). At a later time, upon receipt of a second content request 180, the caching device 140 can use the obtained content 170 that the caching device 140 stored earlier, in the cache storage (See FIG. 2, 207 Table) without the need to forward a second content request 180 to the origin server 150.

In step 312 the caching device 140 observes an access identifier 172 provided by the origin server 140 in response to a first content request 160, the access identifier 172 providing an authentication indication for accessing the content 190 (e.g. in response to a later second content request 180) obtained from the origin server 150. The caching device 140 may modify a table 207 such that the table 207 includes an entry (See FIG. 8, 630) authorizing the caching device 140 to provide the content 170 in response to content requests (e.g. first or second content requests 160, 180) which include the access identifier 172. The caching device 140 may also read the timestamp (See FIG. 7, 644) in the access identifier (See FIG. 7, 640), compare the timestamp (See FIG. 7, 644) to an expiration indicator (See FIG. 6, 634), and avoid providing the authentication indication if the timestamp (See FIG. 7, 644) exceeds the expiration indicator (See FIG. 6, 634).

As described earlier, the origin server 150, in addition to providing requested content 170, as a result of a first content request 160 will also transmit an access identifier 172 that the caching device 140 receives. Upon receipt of the access identifier 172, the caching device 140 also stores the access identifier 172 in cache storage (See FIG. 2, 207 Table). The caching device 140 then transmits the access identifier 172 to the client computer system 130 along with the content 170 (e.g. originally obtained from the origin server 150) where the client computer system 130 stores the access identifier 172. At a later time (e.g. when the computer system 130 initiates a second content request 180), the client computer system 130 can transmit the same access identifier 172 (e.g. initially obtained from the origin server 150) to the caching device 140.

The caching device 140 maintains a table 207. As described earlier, the table 207 contains entries (See FIG. 8, 618) which represent the access identifier 172 (e.g. the access identifier 172 received from the origin server 150 in response to a first content request 160) which may be used to determine whether adequate authorization exists such that the caching device 140 can provide content 190 to a client computer system 130 in response to a second content request 160 at such time as a client computer system 130 transmits a second content request 180 to the caching device 140. In effect, the access identifier 172 in the table 207 is a duplicate of the access information 172 which the caching device 140 observed that was transmitted by the origin server 150 to the caching device 140 in connection with an earlier first content request 160.

In step 314, the caching device 140 receives a second content request 180, and performs one of (i) preventing the origin server 150 from handling the second content request 180 and providing the obtained content 190 when the second content request 180 includes the access identifier 172, and (ii) forwarding the second content request 180 to the origin server 150 for processing when the second content request 180 does not include the access identifier 172.

If the caching device 140, determines that it contains the content 170 requested, the caching device 140 has an option to transmit the requested content (e.g. obtained content 172). That is, the caching device 140 may elect to provide the requested content 190 (e.g. the content 190 requested in a second content request 180) from cache storage 207 within the caching device 140 if the caching device 140 receives an access identifier 182 from the client computer system 130 which is equivalent to the access identifier 172 that the caching device 140 received from the origin server 150 when the caching device 140 received an earlier first content request 160 for the same content 170. In that case (e.g. the case of providing the requested content 190 from cache storage 207 as a result a second content request 180), the caching device 140 can compare the access identifier 182 received with second content request 180 to the access identifier 172 received from the origin server 150 as a result of the first content request 170 as an authentication indication to determine if the caching device 140 should fulfill the second content request 180 or forward the second content request to the origin server 150 for processing as will be described in more detail later. The caching device 140 can also use other methods to determine whether to provide content 190 as a result of the second content request 180 or forward the second content request 180 as will also be described later in more detail.

If the caching device 140 receiving a second content request 180 determines that the access identifier 182 which the client computer system 130 transmitted to the caching device 140 is not equivalent to the access identifier 172 provided by the origin server 150 in response to a first content request 160 for the same content 170 (e.g. as in the case of the client computer system 130 having a new defunct access identifier 182 with respect to certain requested content), the caching device 140 will not transmit the requested content 190 to the client computer system 130 from the caching device's 140 cache storage 207 even if the content 170 exists in cache storage 304. Instead the caching device 140 will forward the content request 180 received from the client computer system 130 along with the access identifier 182 to the origin server 150 for processing.

Accordingly, at this point, the origin server 150 has received a second request for content 180 and access identifier 182 combination which the caching device 140 has identified as being different from the content 170 and access identifier 172 information which the origin server 150 provided earlier in response to a first request for content 160 from the client computer system 130 for the same content 170 that the client computer system 130 is again requesting. The origin server 150 can evaluate the second content request 180 and access identifier 182 and fulfill the second content request 180 just as it would without the existence of a caching device 140.

Figure 4:
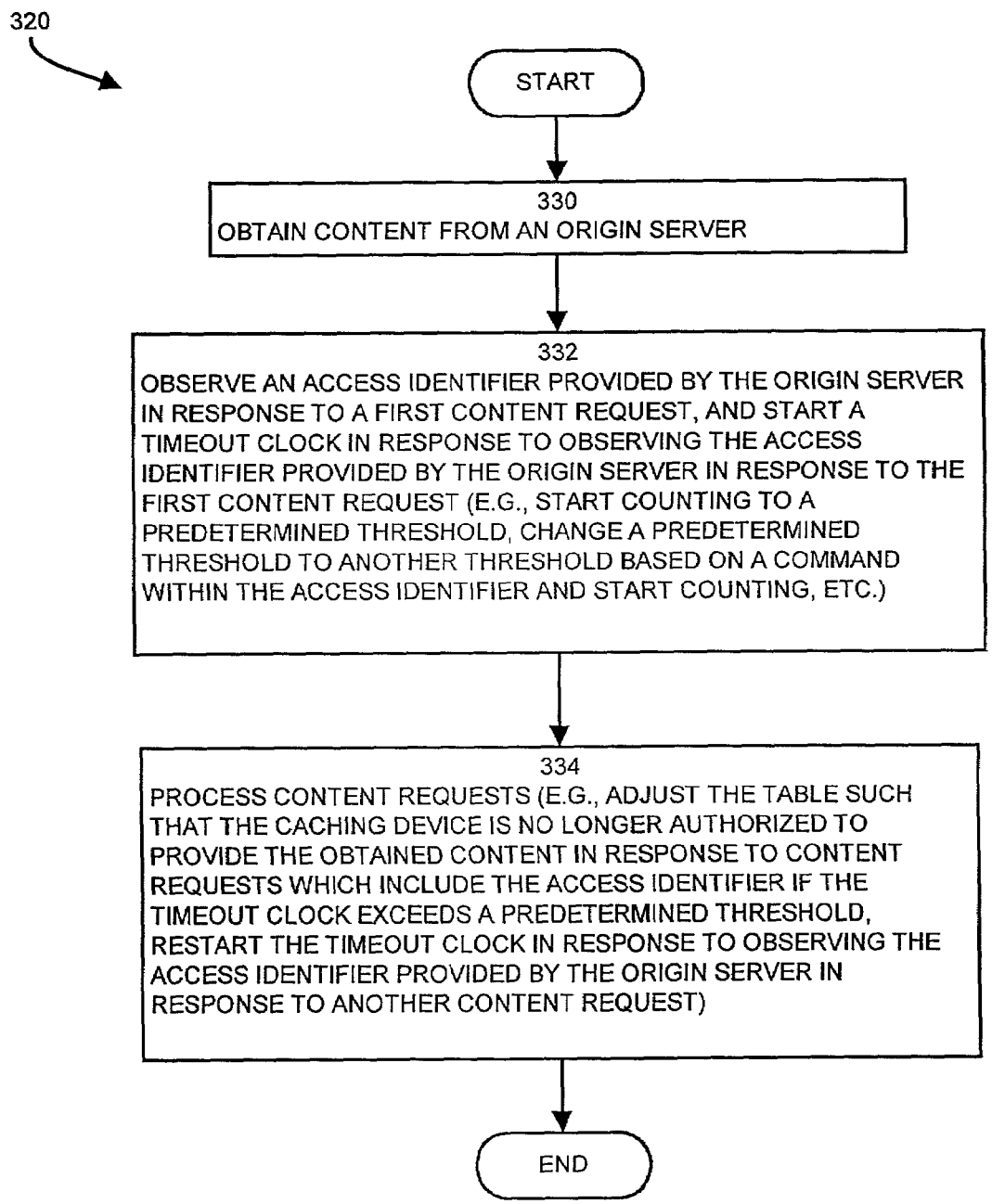
FIG. 4 is a flow chart of a procedure for observing and processing an access identifier provided by the origin server according to one embodiment of the invention.

Further details of the embodiments of the invention will now be provided with reference to FIG. 4.

FIG. 4 is a flow chart of a procedure 320 for observing and processing an access identifier provided by the origin server according to one embodiment of the invention.

In step 330 the caching device 140 obtains content 170 from an origin server 150 in the same manner as described in FIG. 3.

In step 332, the caching server 140 observes an access identifier 172 provided by the origin server 150 in response to a first content request 160, as described earlier with respect to step 312 of FIG. 3.

The caching server 140 also starts a timeout clock 212 in response to observing the access identifier 172 provided by the origin server 150 in response to the first content request 160. The caching device 140 may also change a predetermined threshold 308 to another threshold based on a command 646 within the access identifier 172.

In one example, a second request for content 170 may result in a particular web page being provided by the caching device 140 to the client computer system 130 from cache storage 207 and then as a result of an additional second content request 180 from the client computer system 130, the caching device 140 may actually refuse to provide the same content 190 from cache storage 207 because the predetermined threshold 208 has been exceeded. This example shows that the caching device 140 may receive successive requests (e.g. second content requests 180) that the caching device 140 may or may not fulfill from the caching device's 140 cache storage 207 depending upon whether the requests for content (e.g. second requests for content 180) were generated within the pre-determined threshold 207 (e.g. time threshold).

The timeout clock 212 is a mechanism used to limit caching devise 140 authorization to provide content 190 to a user within a predetermined time threshold 208, as in another example, the case of a content provider wishing to use the services of the caching device 140 to host certain order entry pages of its web site requiring a high level of security. As a consequence, the content provider designates that such high security web pages have a time limit of only sixty seconds (e.g. one minute) during which the web page will be allowed to be provided (e.g. the caching device 140 is authorized to provide such web pages) by the caching device 140. Therefore, if a client computer system 130 requests the same web page a second time more than 60 seconds after having requested the web page for the first time, the caching device 140 will not provide the requested content 190 to the client computer system 130 as a result of that second content request 170 (e.g. another second content request 180 initiated more than 60 seconds after a prior content request (e.g. either a first or second content request 160, 180 to the caching device 140; note that a first content request 160 resulted in the requested content 170 being stored in the table 207, that is, cache storage).

The caching device 140 may also use information and/or commands from the access identifier 182 in other ways. For example, the access identifier 182 may contain a user type classification command. Accordingly, the caching device 130 can change the predetermined threshold 208, for example, stored as part of the hostname information (See FIG. 7, 614) to another predetermined threshold (See FIG. 7, 614) from a high value of 600 seconds to a value of 120 seconds, thereby restricting access to a particular client computer system 130. It is possible to modify the predetermined threshold 207 based on other information from the access identifier 182 as well, such as, for example, to modify the predetermined threshold 207 upon a date, based on specific users, or based on other factors stored in the access identifier 182.

In step 334, the caching device 140 processes content requests 160, 180. The caching device adjusts the table 207 such that the caching device 140 is no longer authorized to provide the obtained content in response to content requests 180 (e.g. second content requests 180) which include the access identifier 182 if the timeout clock 212 exceeds a predetermined threshold 208. The caching device 140 restarts the timeout 212 clock in response to observing the access identifier 197 provided by the origin server 150 in response to another content request (e.g. a second content request 180).

After the timeout clock 212 exceeds a pre-determined threshold 208 the caching device 140 may be no longer authorized to provide content 170 for one or more reasons besides the expiration of the timeout clock 212. For example, if, as a result of a second content request 180 in connection with which the timeout clock 212 has exceeded the predetermined threshold 208, the caching device 140 forwards the second content request back to the origin server 140, the origin server 140 might determine that such a second content request 170 is no longer authorized at all because the client computer system 130 has an outstanding unpaid balance. Accordingly, the origin server 140 may return an access identifier 197 that the caching device 140 uses to update its table 207 in a manner that will ensure that the caching device 140 is not authorized to provide the client computer system 130 any content until the outstanding balance has been paid. Accordingly, the host name information (See FIG. 8 614 and 630) of the table 207 can be adjusted to zero seconds allowed for the timeout clock 212. Upon a later second request for content 180, from the client computer system 130, the caching device 140 will forward all such requests (e.g. due to the fact that the predetermined threshold 208 of zero seconds will have been exceeded) to the origin server 150 for processing.

As demonstrated in the example above, if the caching device 140 receives a second request for content 180, from a client computer system 130 after a predetermined time threshold 208 of time has elapsed, (e.g. individual thresholds for each client ID, request location, access identifier, etc. combination are stored in the table 207) as indicated by the time out clock 212, the caching device 140 will adjust the particular predetermined threshold (See FIG. 7, 630) stored the table 207 to zero (according to one embodiment of the invention), or to some other value indicating that the second content request 180 had exceeded the predetermined threshold of time thereby indicating that the caching device 140 is no longer authorized to provide the requested content 170 from its cache storage (e.g. the Table 207). As a result, the caching device 140 will forward such second content requests 180 to the origin server for processing.

On the other hand, the timeout clock 212 may be restarted based on content 195 and access identifier 197 response to a second content request 180 by the origin server 150. Accordingly, the caching device 140 also forwards a second content request 180 to the origin server 150, and in turn, the origin server 150 may transmit the requested content 195 via the caching device 140 to the client computer system 130 (along with an access identifier 197). Upon observing the access identifier 197, the caching device 140 can restart the timeout clock 212. Accordingly, future content requests (e.g. future second requests for 180) may find that the caching device 140 is again authorized to provide such designated content 195.

Figure 5:
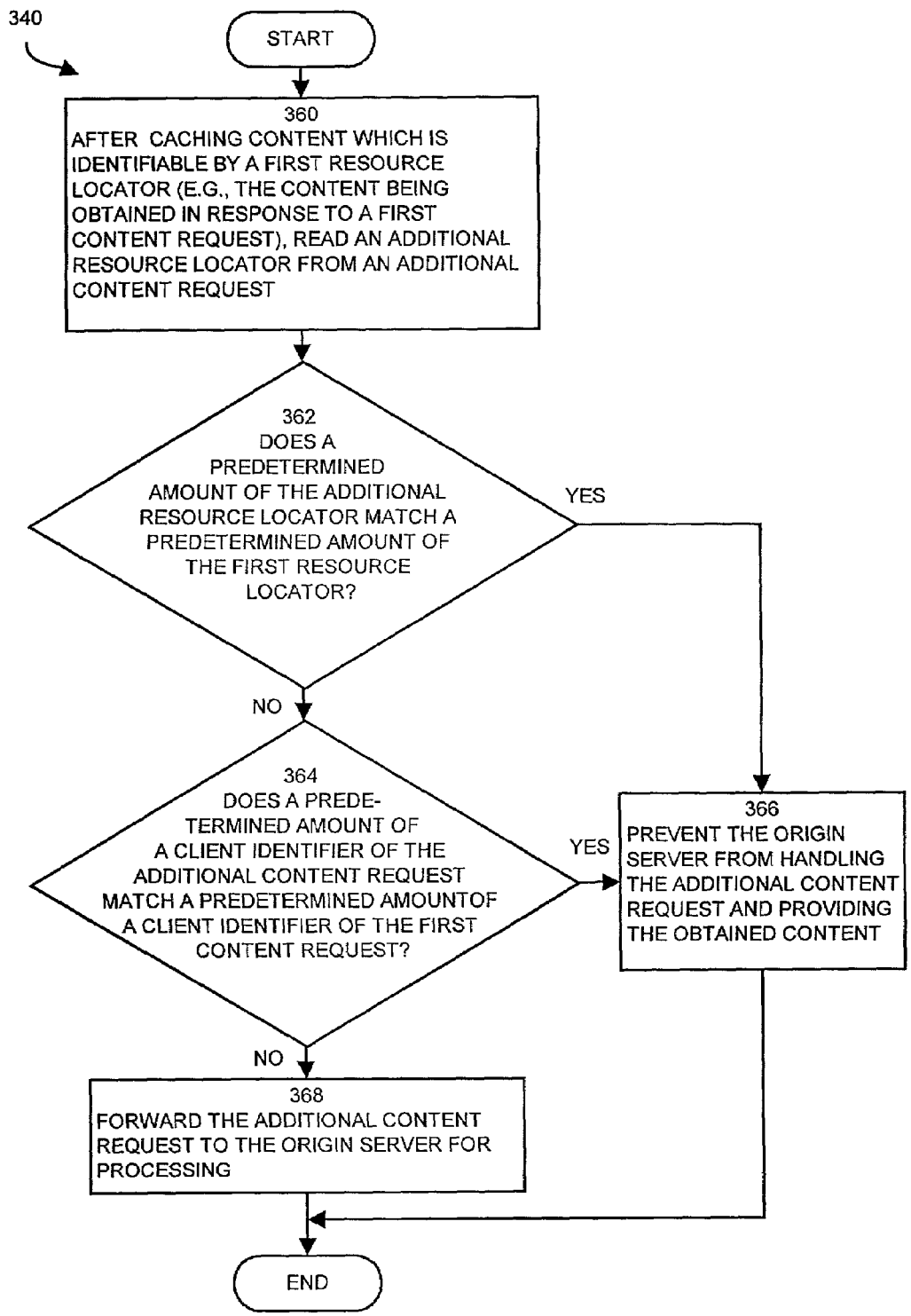
FIG. 5 is a flow chart of a procedure for processing resource locators and client identifiers in the process of determining how to provide obtained content according to one embodiment of the invention.

Further details of the embodiments of the invention will now be provided with reference to FIG. 5

FIG. 5 is a flow chart of a procedure 340 for processing resource locators 650, 660 and client identifiers 672, 682 in the process of determining how to provide obtained content 172, 182, 195 according to one embodiment of the invention.

In step 360, after the caching device 140 caches content 172 which is identifiable by a first resource locator (See FIG. 9, 650) (e.g., the content 172 being obtained in response to a first content request 160), the caching device 140 reads an additional resource locator (See FIG. 9, 660) from an additional content request 180.

Figure 9:
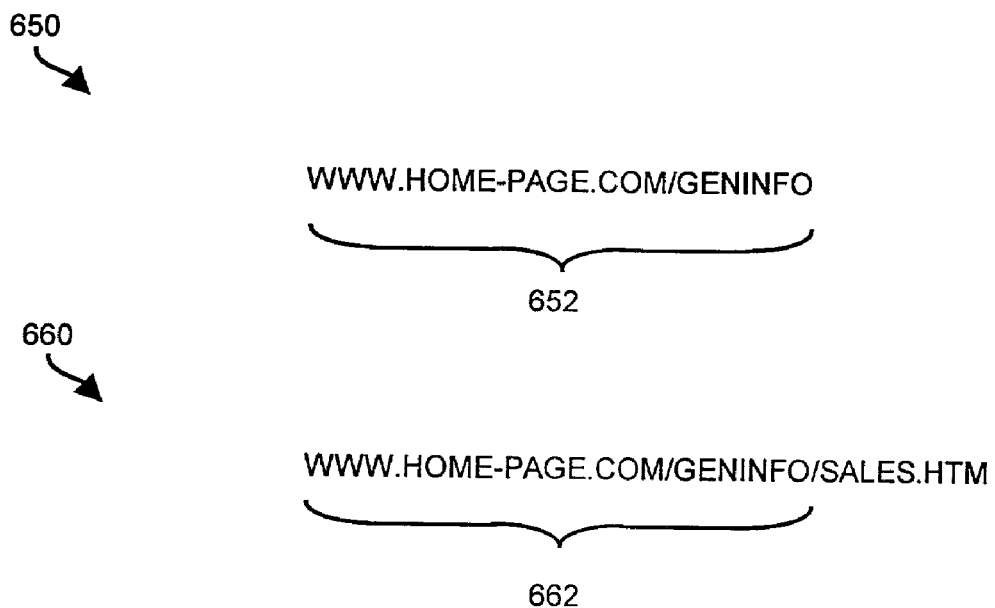
FIG. 9 shows a first and additional resource locator according to one embodiment of the invention.

In step 362, the caching device 140 determines if a predetermined amount (See FIG. 6, 638) of the second resource locator (See FIG. 9, 662) matches a predetermined amount (See FIG. 6, 638) of the first resource locator (See FIG. 9, 652). The use of a portion of one resources locator 660 to match a portion of the other resource locator 650, establishes a hierarchical criteria allowing a multiple of resource locators 660 to meet the criteria.

In step 364, the caching device 140 determines if a predetermined amount (See FIG. 7, 636) of the second client identifier (See FIG. 10, 682) matches a predetermined amount (See FIG. 7, 636) of the first client identifier (See FIG. 10, 672) in a similar fashion as described above for comparison of resource locators (See FIG. 9, 650, 660). Various types of client identifiers (See FIG. 670, 680) may be used. In one example (See FIG. 10, 670, 680) an access identifier may include a user identification. In another example, client identifications may be IP addresses (See FIG. 7, 610). Various different types of client identifications are possible.

In step 366, the caching device 140 prevents the origin server 150 from handling the second content request 180 and providing the obtained content 172 when a predetermined amount 662 of the second resource locator 660 matches a predetermined amount 652 of the first resource locator 650. Accordingly, the caching device 140 is configured to transmit content 172 from cache storage 207 to the client computer system 130 in response to the second content request 180 if a predetermined amount 638 of the resource locator 660 of the second content request 180 sent to the caching device 140 matches a predetermined amount 638 of a resource locator (e.g. a first resource locator 650 or a separately identified resource locator).

Although step 366 describes the situation in which either a predetermined amount (See FIG. 6, 638) of the second resource locator (See FIG. 9, 662) matches a predetermined amount (See FIG. 6, 638) of the first resource locator (See FIG. 9, 652) or a predetermined amount (See FIG. 7, 636) of the second client identifier (See FIG. 10, 682) matches a predetermined amount (See FIG. 7, 636) of the first client identifier (See FIG. 10, 672), other configurations are also possible. For example, in another situation, the matching of both a predetermined amount (See FIG. 6, 638) of the second resource locator (See FIG. 9, 662) to a predetermined amount (See FIG. 6, 638) of the first resource locator (See FIG. 9, 652) and a predetermined amount (See FIG. 7, 636) of the second client identifier (See FIG. 10, 682) to a predetermined amount (See FIG. 7, 636) of the first client identifier (See FIG. 10, 672) may both be required for the caching device 140 to prevent the origin server 150 from handling the second content request 180 and providing the obtained content 172.

Figure 6:
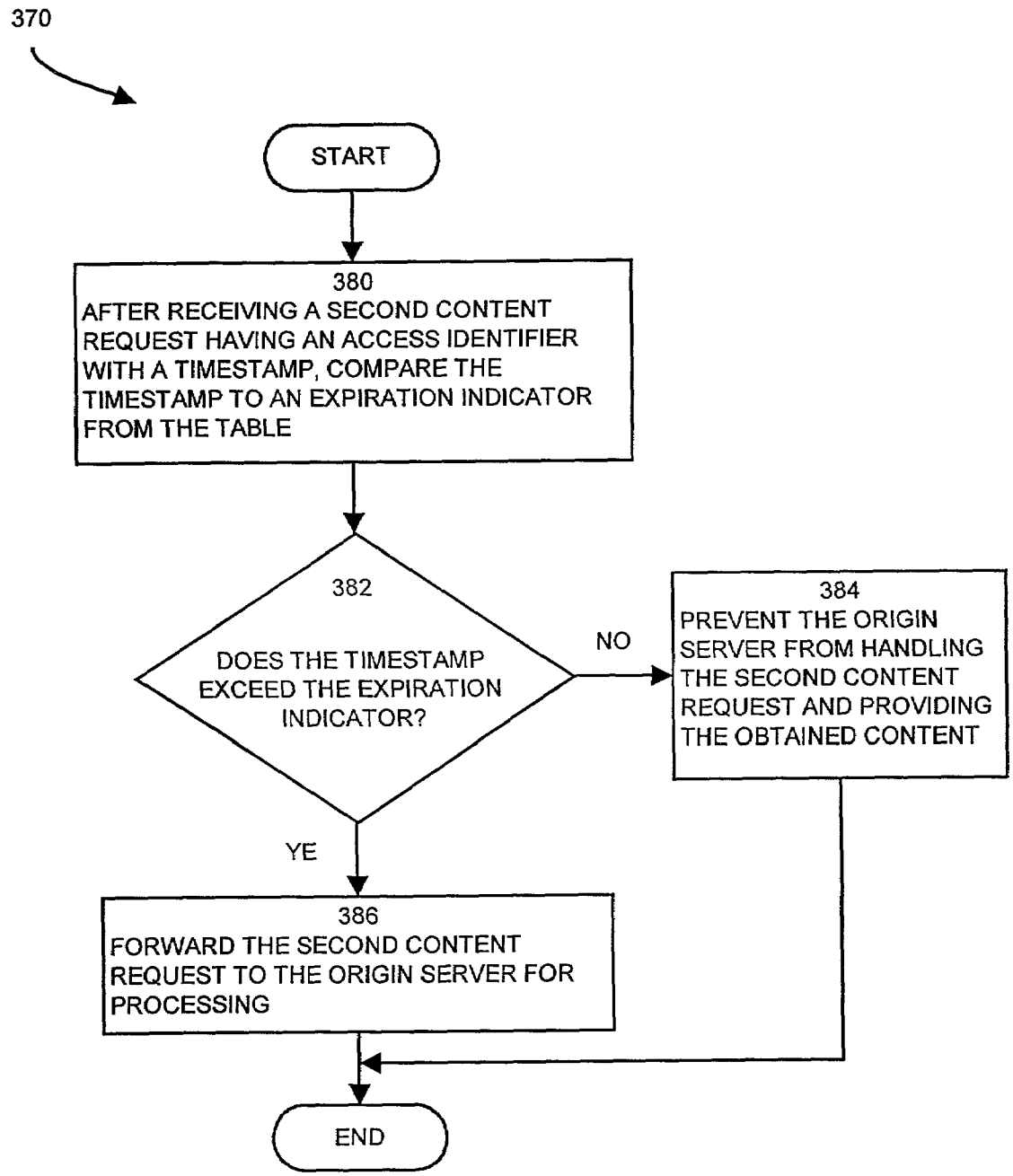
FIG. 6 is a flow chart of a procedure for processing access identifier timestamps in the process of determining how to provide obtained content according to one embodiment of the invention.

In step 368, the caching device 140 forwards the second content request 180 to the origin server 150 for processing as described earlier Further details of the embodiments of the invention will now be provided with reference to FIG. 6.

FIG. 6 is a flow chart 370 of a procedure for processing access identifier timestamps in the process of determining how to provide obtained content according to one embodiment of the invention.

In step 380, after receiving a second content request 180 having an access identifier 182 with a timestamp (See FIG. 8, 644) the caching device 140 compares the timestamp (See FIG. 8, 644) to an expiration indicator (See FIG. 7, 634) from the table 207. Accordingly, the caching device 140 is able to determine if a timestamp (See FIG. 8, 664) representing a pre-established time frame, transmitted to the client computer system 130 within the access identifier 172 at the time of first content request 170 has transpired.

In step 382, the caching device 140 determines if the timestamp (See FIG. 8, 664) exceeds the expiration indicator (See FIG. 7, 634). Although dates may be used for both the timestamp (See FIG. 8, 644) and expiration indicator (See FIG. 7, 634), other measurements of time, etc. may also be used to perform this function.

In step 384, the caching device 140 prevents the origin server 150 from handling the second content request 180 and providing the obtained content 172 when the timestamp (See FIG. 8, 644) does not exceed the expiration indicator (See FIG. 7, 634). In other words, the caching device 140 is configured to transmit content 172 from cache storage 207 to the client computer system 130 in response to a second content request 180 if the timestamp (See FIG. 8, 644) does not exceed the expiration indicator (See FIG. 7, 634).

In step 386, the caching device 140 forwards the second content request 180 to the origin server 150 for processing, as described earlier.

Further details of the embodiments of the invention will now be provided with reference to FIG. 7.

FIG. 7 is a depicts of a table 600 that stores the data used by the caching device 140 to process content requests (e.g. first and second content requests 160, 180) in according to one embodiment of the invention. The table (e.g. table 207) includes records, each having a client ID 610 field, request location 612 field, hostname information 614 field having a predetermined threshold 630 (e.g. for each individual requested location/entity), a predetermined amount of a resource locator 638, a predetermined amount of a client ID 636, and new client indicator 632, a data field 616, and an access identifier 618 field.

The table 600 is stored in some form of memory 207 such as random access memory, disk storage, etc. The table 207, includes some information which the origin server 150 transmits to the client computer system 130 such as web pages, the data and access identifiers via the caching device 140 in response to a first request content 170 by the client computer system 130.

The client ID 610 provides the caching device 140 with information that the caching device 140 needs to limit authorization to content on a user-specific basis. The predetermined amount 652 of a resource locator 638 represents the number of characters that the origin server 140 will use in matching a second resource locator 660 to a predetermined amount of the first resource locator 650. The new client indicator 632 is an indicator of whether or not the caching device 150 will grant access to content which the content server 150 has stored in cache storage 304 in response to a second content request 160 from a user who is different than an earlier user for the same content and/or on the same client computer system 130.

The information stored within an access identify 618 (e.g. such as the access identifier 172 which an origin server 150 sends to a client computer system 130 via the caching device 140, where it is cached, in response to a first content request 160) may vary considerably in content. Depending upon the scheme employed for access identifiers (e.g. cookies), for example, the access identifiers 172 may specifically identify users 610, creation or expiration dates 624, or various other information. Components of the table may also be designated to be used as commands to the caching device 140 for making changes to the predetermined threshold 208 (e.g. which the caching device 140 uses in conjunction with a timeout clock 212) to control authorization to provide content).

Further details of the invention will now be provided with reference to FIG. 8.

FIG. 8 shows data stored within an access identifier 640 according to one embodiment of the invention. The access identifier 642 includes a user identification (ID) field 610, a date field 644 and a miscellaneous or command field 646.

Further details of the invention will now be provided with reference to FIG. 9.

FIG. 9 shows a first and second resource locator according to one embodiment of the invention. In the figure, a predetermined amount 662 of the second resource locator 660 matches the predetermined amount 652 of a first resource locator 650. The first resource locator 652, and second resource locator 662 as shown for use in one embodiment of the invention, are Uniform Resource Locators (URL's). Other types of resource locators are also possible.

In the process of identifying resource locators 650, 660 (e.g. URL's), for which the caching device 140 may be authorized to receive content 190, the caching device 150 will consider the amount 662 of characters 638 of the second resource locator 660 which matches the same predetermined amount 652 of a first resource locator 652 or separately identified resource locator, as authorizing the caching device 140 to provide content 190 in response to a second content request 180.

Figure 10:
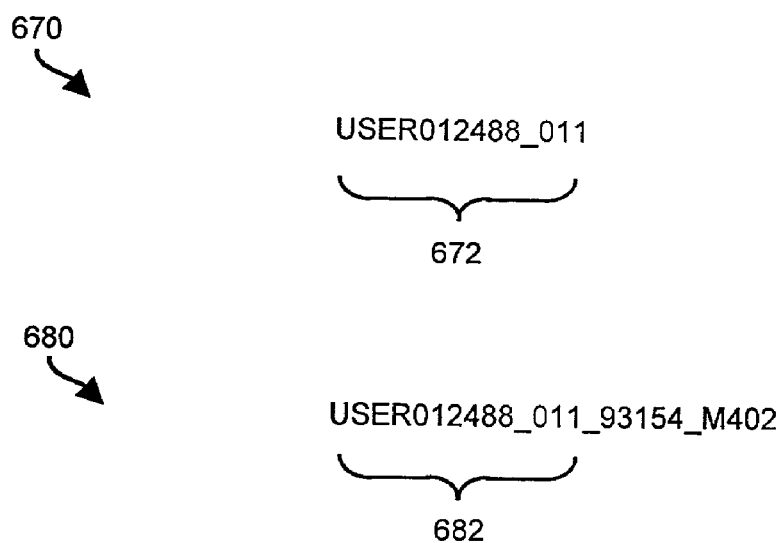
FIG. 10 shows a first and additional client identifier according to one embodiment of the invention.

Further details of the invention will now be provided with reference to FIG. 10.

FIG. 10 shows a first and additional client identifier according to one embodiment of the invention. The figure shows a predetermined amount 682 of the additional client identifier 680 matching the predetermined amount 672 of the first client identifier 670.

Just as in the case of matching the predetermined amount 652, 662 of a first and second resource locator 660, 650 determining proper authorization, the caching device 140 may also match the predetermined amount 682 of the additional client identifier 680 to the predetermined amount 672 of characters 636 of the first client identifier 670 in order to determine whether the caching device 140 is authorized to provide content 190 to the client computer system 130 in response to a second content request 180.

Client identifiers 670, 680 may be any type of identifier of a client such as, for example, the IP address of a client computer system 130 requesting content or user name or number or other identification available from the client computer system 130 or access identifier 172, 182, etc.

Figure 11:
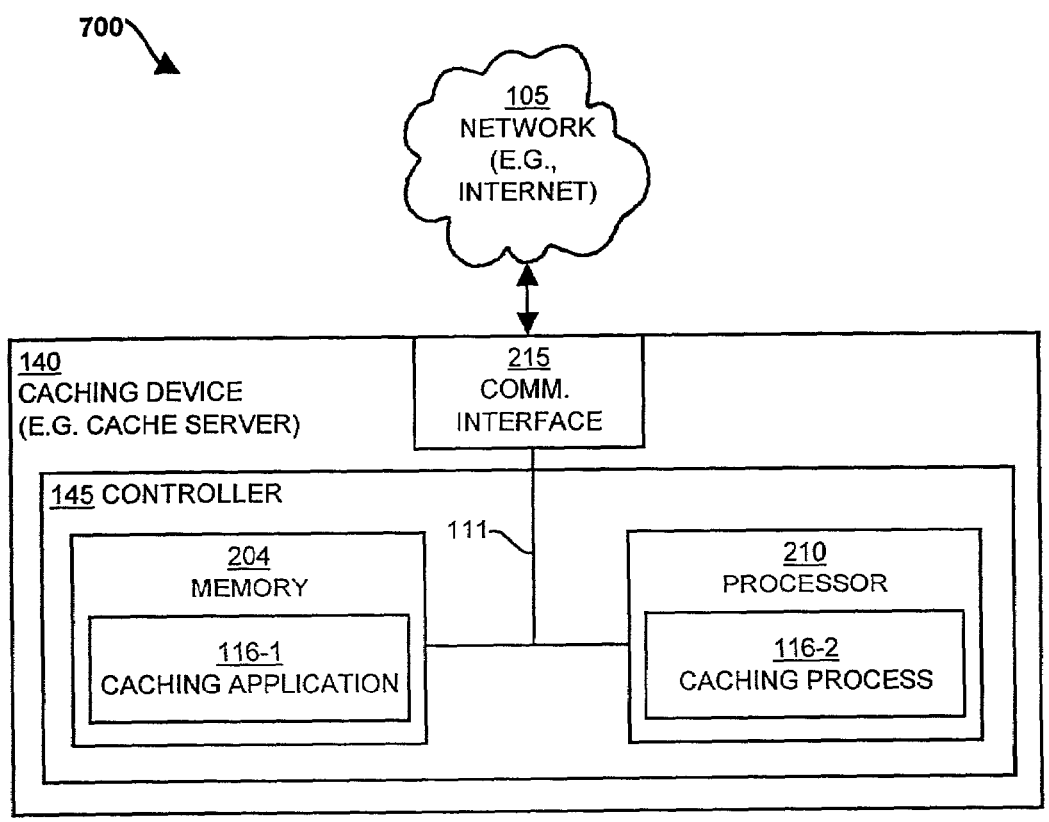
FIG. 11 is a general purpose computer implementation according to one embodiment of the invention.

Further details of the invention will now be provided with reference to FIG. 11.

FIG. 11 shows a general purpose computer implementation according to one embodiment of the invention. The caching device 140 includes an interconnection mechanism 111 (e.g., a data bus and/or circuitry) which couples a memory 112 (e.g., any computer readable medium such as random access memory (RAM) and/or read only memory (ROM) or even a disk or storage medium), a processor 210 (e.g., a microprocessor or central processing unit), and a communications interface 215 (e.g., modem or other network interface). The caching device application 116-1 and/or other applications may be stored in the memory 204 and transferred between memory 204 and the processor 210. The memory 204, for example, may store a caching device application 116-1 and other applications such as operating systems or other application software programs. The processor 210 executes the caching device application 116-2 and or other programs.

The process of receiving a first request for content 160 and other related information, observing an access identifier 172 transmitted from an origin server 150 and either filling a second content request 180 or forwarding the second content request to the origin server 150 for processing are performed on a general purpose computer 700 in the same manner as described in FIGS. 3,4,5,6.

The features of the invention may be employed in data communications device and other computerized devices such as those manufactured by Cisco systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, data communications devices can be routers, bridges, switches, access servers, gateways, hubs, concentrators, proxy servers, repeaters and so forth which exchange data over an interconnection of data links. These may be physical connections or may also be provided using wireless communication mechanisms. On the low end they may also be as simple as wire connections between two devices. The network allows data to propagate between various applications that execute on the hosts.

Various physical or hardware data communications connection mechanisms allow devices to interconnect with the network 105. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices. For example, certain devices or hosts may have high speed network interfaces which provide connections to the network at high data rate such as fractional-T1, T1, E1 or higher, while other devices or hosts may use an inexpensive modem that provides a maximum data transfer rate of 56.6 kilobits per second (Kbps), more or less, to and from the network.

Other embodiments of the invention include a computer system, such as a data communications device, computerized device, or other device configured with software and/or circuitry to process and perform all of the method operations noted above and disclosed herein as embodiments of the invention. In such embodiments, the memory system is encoded with a caching application that when performed on the processor, produces a caching process that causes the computer system to perform any and/or all of the method embodiments, steps and operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized and disclosed in detail herein. As an example, a data communications device software control application, such as a data communications device operating system configured to operate as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for controlling transmission of stream data between the client and stream servers in a networked computer environment, such that the computer program logic, when executed on at least one processing unit with the computerized device, causes the at least one processing unit to perform any or all of the aforementioned methods.

What is claimed is:

1. In a caching device, a method for providing content, comprising the steps of:
   (A) obtaining content from an origin server;
   (B) observing an access identifier provided by the origin server in response to a first content request, the access identifier providing an authentication indication for accessing the content obtained from the origin server; and
   (C) receiving a second content request, and one of (i) preventing the origin server from handling the second content request and providing the obtained content when the second content request includes the access identifier, and (ii) forwarding the second content request to the origin server for processing when the second content request does not include the access identifier;
   in response to receiving the second content request:
   comparing the access identifier received with second content request to the access identifier received from the origin server;
   if the comparison indicates that the access identifier received with second content request is equivalent to the access identifier received from the origin server, performing the step of (i) preventing the origin server from handling the second content request and providing the obtained content; and if the comparison indicates that the access identifier received with second content request is not equivalent to the access identifier received from the origin server, performing the step of (ii) forwarding the second content request to the origin server for processing;

wherein observing the access identifier comprises reading the access identifier provided by the origin server in response to the first content request, the access identifier configured as a cookie that provides authentication indication to a client computer device for accessing the content obtained from the origin server;

wherein, in response to receiving the second content request:

comparing the access identifier received with second content request to the access identifier received from the origin server comprises comparing a cookie received with the second content request to the cookie received from the origin server;

if the comparison indicates that the cookie received with second content request is equivalent to the cookie received from the origin server, performing the step of (i) preventing the origin server from handling the second content request and providing the obtained content; and if the comparison indicates that the cookie received with second content request is not equivalent to the cookie received from the origin server, performing the step of (ii) forwarding the second content request to the origin server for processing.

2. The method of claim 1 wherein the step of observing the access identifier provided by the origin server in response to the first content request includes the step of:

modifying a table such that the table includes an entry authorizing the caching device to provide the obtained content in response to content requests which include the access identifier.

3. The method of claim 2, further comprising the steps of:
starting a timeout clock in response to observing the access identifier provided by the origin server in response to the first content request; and
adjusting the table such that the caching device is no longer authorized to provide the obtained content in response to content requests which include the access identifier if the timeout clock exceeds a predetermined threshold.

4. The method of claim 3, further comprising the step of:
changing the predetermined threshold to another threshold based on a command within the access identifier.

5. The method of claim 2, further comprising the step of:
starting a timeout clock in response to observing the access identifier provided by the origin server in response to the first content request; and
restarting the timeout clock in response to observing another access identifier provided by the origin server in response to another content request.

6. The method of claim 1 wherein the content is identifiable by a first resource locator, wherein an additional content request includes an additional resource locator, and wherein the method further includes the step of:

preventing the origin server from handling the additional content request and providing the obtained content when a predetermined amount of the additional resource locator matches a predetermined amount of the first resource locator; and forwarding the additional content request to the origin server for processing when the predetermined amount of the additional resource locator does not match the predetermined amount of the first resource locator.

7. The method of claim 6, wherein:
preventing the origin server from handling the additional content request and providing the content obtained by the communications interface from the origin server when the predetermined amount of the additional resource locator matches the predetermined amount of the first resource locator comprises:

comparing a predetermined number of characters within the additional resource locator with a predetermined number of characters within the first resource locator, the additional resource locator configured as a Uniform Resource Locator (URL) and the first resource locator configured as a URL, and preventing the origin server from handling the additional content request and providing the content obtained by the communications interface from the origin server when a predetermined number of characters within the additional resource locator matches the predetermined number of characters within the first resource locator; and forwarding the additional content request to the origin server for processing when the predetermined amount of the additional resource locator does not match the predetermined amount of the first resource locator comprises:

comparing the predetermined number of characters within the additional resource locator with the predetermined number of characters within the first resource locator, the additional resource locator configured as a URL and the first resource locator configured as a URL; and forwarding the additional content request to the origin server for processing when the predetermined number of characters within the additional resource locator does not match the predetermined number of characters within the first resource locator.

8. The method of claim 1 wherein the first content request includes a first client identifier, wherein an additional request includes an additional client identifier, and wherein the method further includes the step of:

preventing the origin server from handling an additional content request and providing the obtained content when a predetermined amount of the additional client identifier matches a predetermined amount of the first client identifier; and forwarding the additional content request to the origin server for processing when the predetermined amount of the additional client identifier does not match the predetermined amount of the first client identifier.

9. The method of claim 1 wherein the content is identifiable by a first resource locator, wherein an additional content request includes an additional resource locator, wherein the first content request includes a first client identifier, wherein an additional request includes an additional client identifier, and wherein the method further includes the step of:

preventing the origin server from handling the additional content request and providing the obtained content when a predetermined amount of the additional resource locator matches a predetermined amount of the first resource locator and a predetermined amount of the additional client identifier matches a predetermined amount of the first client identifier; and forwarding the additional content request to the origin server for processing when the predetermined amount of the additional resource locator does not match the predetermined amount of the first resource locator; and forwarding the additional content request to the origin server for processing when the predetermined amount of the additional client identifier does not match the predetermined amount of the first client identifier.

10. The method of claim 1 wherein the access identifier includes a timestamp and the table includes an expiration indication, and wherein the step of observing includes the steps of:
   reading the timestamp in the access identifier when the second content request includes the access identifier;
   comparing the timestamp to the expiration indicator; and
   preventing the origin server from handling an additional content request and providing additional content when the timestamp does not exceed the expiration indicator; and
   forwarding the additional content request to the origin server for processing when the timestamp exceeds the expiration indicator.

11. The method of claim 1, wherein:
   obtaining content from the origin server comprises obtaining content from the origin server in the absence of a preset security agreement between the origin server the caching device; and
   comparing a cookie received with the second content request to the cookie received from the origin server further comprises detecting an authorization of the second content request based upon the results of the comparison between the cookie received with the second content request and the cookie received from the origin server.

12. A caching device, comprising:
   an communications interface;
   a controller coupled to the interface,
      wherein the communications interface is configured to obtain content from the origin server;
      the controller is configured to observe an access identifier provided by the origin server in response to a first content request, the access identifier providing an authentication indication for accessing the content obtained from the origin server; and
      the controller is configured to receive a second content request, and one of (i) preventing the origin server from handling the second content request and providing the obtained content when the second content request includes the access identifier, and (ii) forwarding the second content request to the origin server for processing when the second content request does not include the access identifier,
   in response to receiving the second content request:
   the controller is configured to compare the access identifier received with second content request to the access identifier received from the origin server;
   if the comparison indicates that the access identifier received with second content request is equivalent to the access identifier received from the origin server, the controller is configured to perform the step of (i) preventing the origin server from handling the second content request and providing the obtained content; and
   if the comparison indicates that the access identifier received with second content request is not equivalent to the access identifier received from the origin server, the controller is configured to perform the step of (ii) forwarding the second content request to the origin server for processing;
   wherein when observing the access identifier the controller is configured to read the access identifier provided by the origin server in response to the first content request, the access identifier configured as a cookie that provides authentication indication to a client computer device for accessing the content obtained from the origin server;
   wherein, in response to receiving the second content request the controller is configured to:
   when comparing the access identifier received with second content request to the access identifier received from the origin server comprises compare a cookie received with the second content request to the cookie received from the origin server;
   if the comparison indicates that the cookie received with second content request is equivalent to the cookie received from the origin server, perform the step of (i) preventing the origin server from handling the second content request and providing the obtained content; and
   if the comparison indicates that the cookie received with second content request is not equivalent to the cookie received from the origin server, perform the step of (ii) forwarding the second content request to the origin server for processing.

13. The caching device of claim 12 wherein a table exists within the controller and wherein, to observe the access identifier provided by the origin server in response to the first content request, the controller is configured to:
   modify the table, within the controller, such that the table includes an entry authorizing the caching device to provide the obtained content in response to content requests which include the access identifier.

14. The caching device of claim 13, wherein a predetermined threshold is stored within the controller includes a timeout clock and the controller is configured to:
   start a timeout clock in response to observing the access identifier provided by the origin server in response to the first content request; and
   adjust the table, within the controller, such that the caching device is no longer authorized to provide the obtained content in response to content requests which include the access identifier if the timeout clock exceeds the predetermined threshold.

15. The caching device of claim 14, wherein the controller is configured to:
   change the predetermined threshold to another threshold based on a command within the access identifier.

16. The caching device of claim 13, wherein the controller is configured to:
   start a timeout clock in response to observing the access identifier provided by the origin server in response to the first content request; and
   restart the timeout clock in response to observing another access identifier provided by the origin server in response to another content request.

17. The caching device of claim 12 wherein the content, obtained from the origin server is identifiable by a first resource locator, wherein the additional content request includes an additional resource locator, and wherein, to receive the additional content request, the controller is configured to:
   prevent the origin server from handling the additional content request and provide the content obtained by the communications interface from the origin server when a predetermined amount of the additional resource locator matches a predetermined amount of the first resource locator; and
   forward the additional content request to the origin server for processing when the predetermined amount of the additional resource locator does not match the predetermined amount of the first resource locator.

18. The caching device of claim 12 wherein the first content request includes a first client identifier, wherein the additional content request includes an additional client identifier, and wherein, to receive a additional content request, the controller is configured to:
  prevent the origin server from handling the additional content request received by the communications interface from the origin server and provide the obtained content when a predetermined amount of the additional client identifier matches a predetermined amount of the first client identifier; and
  forward the additional content request to the origin server for processing when the predetermined amount of the additional client identifier does not match the predetermined amount of the first client identifier.

19. The caching device of claim 12 wherein the content is identifiable by a first resource locator, wherein an additional content request includes an additional resource locator, wherein the first content request includes a first client identifier, wherein an additional request includes an additional client identifier, and wherein, to receive an additional content request, the controller if configured to:
  prevent the origin server from handling the additional content request and providing the obtained content when a predetermined amount of the additional resource locator matches a predetermined amount of the first resource locator and a predetermined amount of the additional client identifier matches a predetermined amount of the first client identifier; and
  forward the additional content request to the origin server for processing when the predetermined amount of the additional resource locator does not match the predetermined amount of the first resource locator; and
  forward the additional content request to the origin server for processing when the predetermined amount of the additional client identifier does not match the predetermined amount of the first client identifier.

20. The caching device of claim 12 wherein the access identifier includes a timestamp and the table includes an expiration indication, and wherein the controller is configured to:
  read the timestamp in the access identifier received by the communications interface when the additional content request includes the access identifier;
  compare the timestamp to an expiration indicator from a table stored in memory;
  prevent the origin server from handling an additional content request and providing additional content when the timestamp does not exceed the expiration indicator; and
  forward the additional content request to the origin server for processing when the timestamp exceeds the expiration indicator.

21. A computer program product that includes a computer readable medium having instructions stored thereon such that, when the instructions are carried out by a computer, the computer can be configured to operate as a caching device capable of performing the steps of:
  (A) obtaining content from an origin server;
  (B) observing an access identifier provided by the origin server in response to a first content request, the access identifier providing an authentication indication for accessing the content obtained from the origin server; and
  (C) receiving a second content request, and one of (i) preventing the origin server from handling the second content request and providing the obtained content when the second content request includes the access identifier, and (ii) forwarding the second content request to the origin server for processing when the second content request does not include the access identifier;
  in response to receiving the second content request:
  comparing the access identifier received with second content request to the access identifier received from the origin server;
  if the comparison indicates that the access identifier received with second content request is equivalent to the access identifier received from the origin server, performing the step of (i) preventing the origin server from handling the second content request and providing the obtained content; and
  if the comparison indicates that the access identifier received with second content request is not equivalent to the access identifier received from the origin server, performing the step of (ii) forwarding the second content request to the origin server for processing;
  wherein observing the access identifier comprises reading the access identifier provided by the origin server in response to the first content request, the access identifier configured as a cookie that provides authentication indication to a client computer device for accessing the content obtained from the origin server;
  wherein, in response to receiving the second content request:
  comparing the access identifier received with second content request to the access identifier received from the origin server comprises comparing a cookie received with the second content request to the cookie received from the origin server;
  if the comparison indicates that the cookie received with second content request is equivalent to the cookie received from the origin server, performing the step of (i) preventing the origin server from handling the second content request and providing the obtained content; and
  if the comparison indicates that the cookie received with second content request is not equivalent to the cookie received from the origin server, performing the step of (ii) forwarding the second content request to the origin server for processing.

22. A caching device, comprising:
  memory to store a table;
  a communications interface to communicate with a client computer system;
  a controller to observe an access identifier;
  an interconnection mechanism coupling the memory, communications interface and controller;
  means, coupled to the communications interface, for obtaining content from an origin server;
  means, coupled to the communications interface and controller, for observing an access identifier provided by the origin server in response to a first content request, the access identifier providing an authentication indication for accessing the content obtained from the origin server; and
  means, coupled to the communications interface and controller, for receiving a second content request, and one of (i) preventing the origin server from handling the second content request and providing the obtained content when the second content request includes the access identifier, and (ii) forwarding the second content request to the origin server for processing when the second content request does not include the access identifier, wherein means for receiving comprises means for comparing the access identifier received with second content request to the access identifier received from the origin server;

if the comparison indicates that the access identifier received with second content request is equivalent to the access identifier received from the origin server, performing the step of (i) preventing the origin server from handling the second content request and providing the obtained content; and if the comparison indicates that the access identifier received with second content request is not equivalent to the access identifier received from the origin server, performing the step of (ii) forwarding the second content request to the origin server for processing;

wherein means for observing the access identifier comprises means for reading the access identifier provided by the origin server in response to the first content request, the access identifier configured as a cookie that provides authentication indication to a client computer device for accessing the content obtained from the origin server;

wherein, in response to receiving the second content request:

means for receiving comprises means for comparing the access identifier received with second content request to the access identifier received from the origin server comprises comparing a cookie received with the second content request to the cookie received from the origin server;

if the comparison indicates that the cookie received with second content request is equivalent to the cookie received from the origin server, performing the step of (i) preventing the origin server from handling the second content request and providing the obtained content; and if the comparison indicates that the cookie received with second content request is not equivalent to the cookie received from the origin server, performing the step of (ii) forwarding the second content request to the origin server for processing.

23. A system for providing content comprising:

a client computer system for providing content requests;

an origin server in communication with said client computer system, said origin server for providing content in response to content requests; and a caching device in communication with said client computer system, and said origin server, said caching device comprising:

a controller coupled to the interface, wherein the controller is configured to obtain content from the origin server;

the controller is configured to observe an access identifier provided by the origin server in response to a first content request, the access identifier providing an authentication indication for accessing the content obtained from the origin server; and the controller is configured to receive a second content request, and one of (i) preventing the origin server from handling the second content request and providing the obtained content when the second content request includes the access identifier, and (ii) forwarding the second content request to the origin server for processing when the second content request does not include the access identifier, in response to receiving the second content request:

the controller is configured to compare the access identifier received with second content request to the access identifier received from the origin server;

if the comparison indicates that the access identifier received with second content request is equivalent to the access identifier received from the origin server, the controller is configured to perform the step of (i) preventing the origin server from handling the second content request and providing the obtained content; and if the comparison indicates that the access identifier received with second content request is not equivalent to the access identifier received from the origin server, the controller is configured to perform the step of (ii) forwarding the second content request to the origin server for processing;

wherein when observing the access identifier the controller is configured to read the access identifier provided by the origin server in response to the first content request, the access identifier configured as a cookie that provides authentication indication to a client computer device for accessing the content obtained from the origin server;

wherein, in response to receiving the second content request the controller is configured to:

when comparing the access identifier received with second content request to the access identifier received from the origin server comprises compare a cookie received with the second content request to the cookie received from the origin server;

if the comparison indicates that the cookie received with second content request is equivalent to the cookie received from the origin server, perform the step of (i) preventing the origin server from handling the second content request and providing the obtained content; and if the comparison indicates that the cookie received with second content request is not equivalent to the cookie received from the origin server, perform the step of (ii) forwarding the second content request to the origin server for processing.

* * * * *